(12) United States Patent
Cortesi

(10) Patent No.: US 6,199,125 B1
(45) Date of Patent: Mar. 6, 2001

(54) INPUT MANAGER FOR A COMPUTER APPLICATION WITH DISPLAY ICONS MAPPED TO A USER SELECTABLE SET OF STANDARD KEYBOARD KEYS

(75) Inventor: Gino Cortesi, Lyndell, PA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 09/084,570

(22) Filed: May 26, 1998

(51) Int. Cl.[7] .................................................. G06F 13/00
(52) U.S. Cl. ........................ 710/67; 345/172; 345/173; 345/156
(58) Field of Search .............................. 709/100; 710/67; 395/333, 352; 345/172, 173, 156

(56) References Cited

U.S. PATENT DOCUMENTS

| | | | |
|---|---|---|---|
| 4,823,311 | * | 4/1989 | Hunter et al. ........................ 708/144 |
| 4,896,290 | * | 1/1990 | Rhodes et al. ........................ 710/67 |
| 5,041,967 | * | 8/1991 | Ephrath et al. ....................... 395/352 |
| 5,065,309 | * | 11/1991 | Putnam et al. ....................... 379/110 |
| 5,287,514 | * | 2/1994 | Gram ................................. 395/333 |
| 5,502,839 | * | 3/1996 | Kolnick ................................ 710/1 |
| 5,525,978 | * | 6/1996 | York et al. .............................. 341/22 |
| 5,600,313 | * | 2/1997 | Freedman ............................... 341/22 |
| 5,724,069 | * | 3/1998 | Chen ..................................... 345/172 |
| 5,877,746 | * | 3/1999 | Parks et al. ........................... 345/156 |
| 6,069,628 | * | 5/2000 | Farry et al. ........................... 345/348 |

\* cited by examiner

*Primary Examiner*—Thomas C. Lee
*Assistant Examiner*—Tammara Peyton
(74) *Attorney, Agent, or Firm*—Akin, Gump, Strauss, Hauer & Feld, L.L.P.

(57) ABSTRACT

An input manager operating on a computer system is disclosed. The computer system includes a processor, a display, an application running on the processor and being displayed on the display and a multi-key input device for inputting information to the application. The input manager manages the inputting of at least a portion of the information to the application, and runs on the processor in conjunction with the application and is displayed on the display in conjunction with the application as an input manager display. The input manager display has a command grid having a plurality of grid boxes, where each grid box represents an input choice at any one point in time and potentially several input choices over a period of time. Each grid box is mapped to a pre-determined key on the input device regardless of which input choice such grid box currently represents. Accordingly, activation of the pre-determined key selects the input choice currently represented by the grid box.

34 Claims, 5 Drawing Sheets

35

- 1 MAIN
  - 1.1 LINEAR ELEMENTS
  - 1.2 PATTERNS AND POINTS
  - 1.3 POLYGONS
  - 1.4 CIRCULAR ELEMENTS
  - 1.5 TEXT AND TAGS
  - 1.6 FENCES AND GROUPS
  - 1.7 CELLS
  - 1.8 MEASURE
  - 1.9 DIMENSIONS
  - 1.10 CHANGE ATTRIBUTES
  - 1.11 MANIPULATE
  - 1.12 MODIFY
- 2 3D AND BSPLINES
- 3 TOOLS
  - 3.1 ANNOTATION
  - 3.2 AUX COORDINATES
  - 3.3 DATABASE
  - 3.4 DD DESIGN
  - 3.5 ENGINEERING LINKS
  - 3.6 MULTI-LINE JOINTS
  - 3.7 REDLINE
  - 3.8 REFERENCE FILES
  - 3.9 VIEW CONTROL
  - 3.10 VISUALIZATION
  - 3.11 RENDERING
  - 3.12 ANIMATION
- 4
- 5
- 6
- 7
- 8
- 9
- 10
- 11 SYSTEM
  - 11.1 LICENSE MGMT
  - 11.2 VERSION MGMT
  - 11.3 FILE REPAIR
  - 11.4 CONFIGURATION
  - 11.5 FKEYS
  - 11.6 MENUS
  - 11.7 CUSTOMIZE
- 12 HELP
  - 12.1 SEARCH FOR COMMAND
  - 12.2 HELP CURSOR
  - 12.3 BROWSE HELP

INPUT MANAGER FOR A COMPUTER APPLICATION WITH DISPLAY ICONS MAPPED TO A USER SELECTABLE SET OF STANDARD KEYBOARD KEYS

FIELD OF THE INVENTION

The present invention relates to a mechanism and method for managing the inputting of information to a computer application. More particularly, the present invention relates to an input manager displayed on a computer display and actuated from a computer keyboard or the like.

BACKGROUND OF THE INVENTION

As is well known, one of the major goals of any computer application is or at least should be to be user friendly. To that end, many computer applications have user input mechanisms that are extensively thought out and highly evolved. Unfortunately, many such input mechanisms are now so highly evolved that they are too complicated, too confusing to a user, and/or take up too much screen real estate, thereby overlapping the application viewing area to an unacceptable degree.

In but one example, a multi-layer input mechanism may have a first set of input choices that are displayed in a first dialog box, where choosing one of the input choices from the first dialog box results in the display of a second dialog box along with the first dialog box, choosing one of the input choices from the second dialog box results in the display of a third dialog box along with the first and second dialog boxes, etc. As should be appreciated, the application viewing area may fairly easily be filled up with such a plethora of dialog boxes, to the point where the underlying computer application becomes hidden from view and is relegated to the status of being merely an afterthought.

In the aforementioned dialog box scenario and in other forms of prior art input mechanisms, it is increasingly necessary to make a selection by way of a mouse-driven cursor or the like. Unfortunately, and as one who often uses a mouse will attest to, it can be frustratingly difficult to easily position the cursor by way of the mouse on an appropriate choice in a repeated manner. In particular, such mouse-cursor movement typically involves an initial movement of the mouse and cursor toward a screen target, but which results in an overshoot of the target. One or more reversing movements are then necessary until the cursor is finally positioned on the target as is desired. If, for example, it is necessary to quickly execute four such cursor inputs at four separate locations, the user can quickly become tired and/or exasperated. Moreover, even with practice, input speed is not found to be significantly improved.

Accordingly, a need exists for an input manager that is displayed in a relatively compact area on an application screen such that the input manager does not require too much screen real estate. Further, a need exists for such an input manager where mouse-cursor input can be reduced, and input speed can be significantly improved.

BRIEF SUMMARY OF THE INVENTION

The aforementioned needs are satisfied by an input manager operating on a computer system which includes a processor, a display, an application running on the processor and being displayed on the display and a multi-key input device for inputting information to the application. The input manager manages the inputting of at least a portion of the information to the application, and runs on the processor in conjunction with the application and is displayed on the display in conjunction with the application as an input manager display. The input manager display has a command grid having a plurality of grid boxes, where each grid box represents an input choice at any one point in time and potentially several input choices over a period of time. Each grid box is mapped to a pre-determined key on the input device regardless of which input choice such grid box currently represents. Accordingly, activation of the pre-determined key selects the input choice currently represented by the grid box.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 4 is a chart showing a typical multi-level hierarchy of input choices available by way of the input manager of FIG. 1.

DETAILED DESCRIPTION OF THE INVENTION

Figure 1:
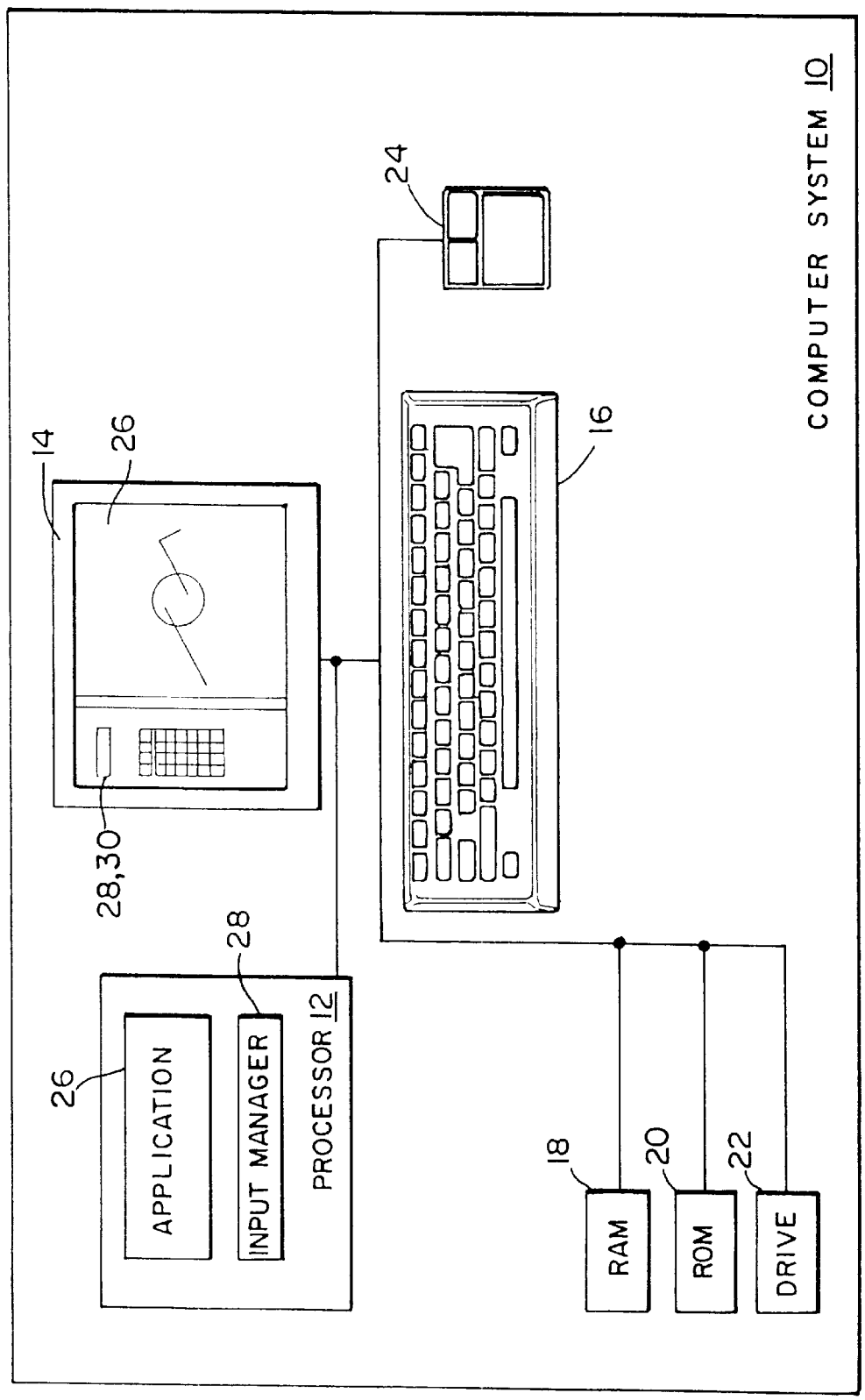
FIG. 1 is a diagrammatic view of a computer system, where an input manager is run on such computer system in conjunction with an application in accordance preferred embodiment of the present invention.

Certain terminology may be used in the following description for convenience only and is not limiting. 'Left', 'right', 'upper', and 'lower' designate directions in the drawings to which a reference is made. The words 'inwardly' and 'outwardly' are further directions toward and away from, respectively, the geometric center of a referenced object. The terminology includes the words above specifically mentioned, derivatives thereof, and words of similar import.

Referring to the drawings in detail, wherein like numerals are used to indicate like elements throughout, there is shown in FIG. 1 a computer system 10 in accordance with a preferred embodiment of the present invention. As may be expected, the computer system 10 includes a processor 12, a display 14, a multi-key input device 16, RAM 18, ROM 20, one or more memory drives 22, and a more-or-less standard mouse 24. Preferably, the input device 16 is a more-or-less standard 101-key keyboard, although one skilled in the art will appreciate that the input device 16 may instead be any of a variety of other keyed devices without departing from the spirit and scope of the present invention.

In the computer system 10, and as seen in FIG. 1, an application 26 is running on the processor 12 and is also being displayed on at least a portion of the display 14. As shown, the displayed application 26 is showing a graphic depiction of an object. As also seen in FIG. 1, in the computer system 10, an input manager 28 in accordance with a preferred embodiment of the present invention is running on the processor 12 in conjunction with the application 26 and is being displayed on the display 14 in conjunction with the application 26. As seen, the input manager 28 is displayed on the display 14 as an input manager display 30. As will be explained in more detail below, the input manager 28 in conjunction with the input manager display 30 manages the inputting of at least a portion of the information that is input to the application 26 running on the processor 12. As one skilled in the art will recognize, the input manager 28 may either be a separate application running on the processor 12, or an embedded part of the application 26 running on the processor 12, without departing from the spirit and scope of the present invention.

Figure 2:
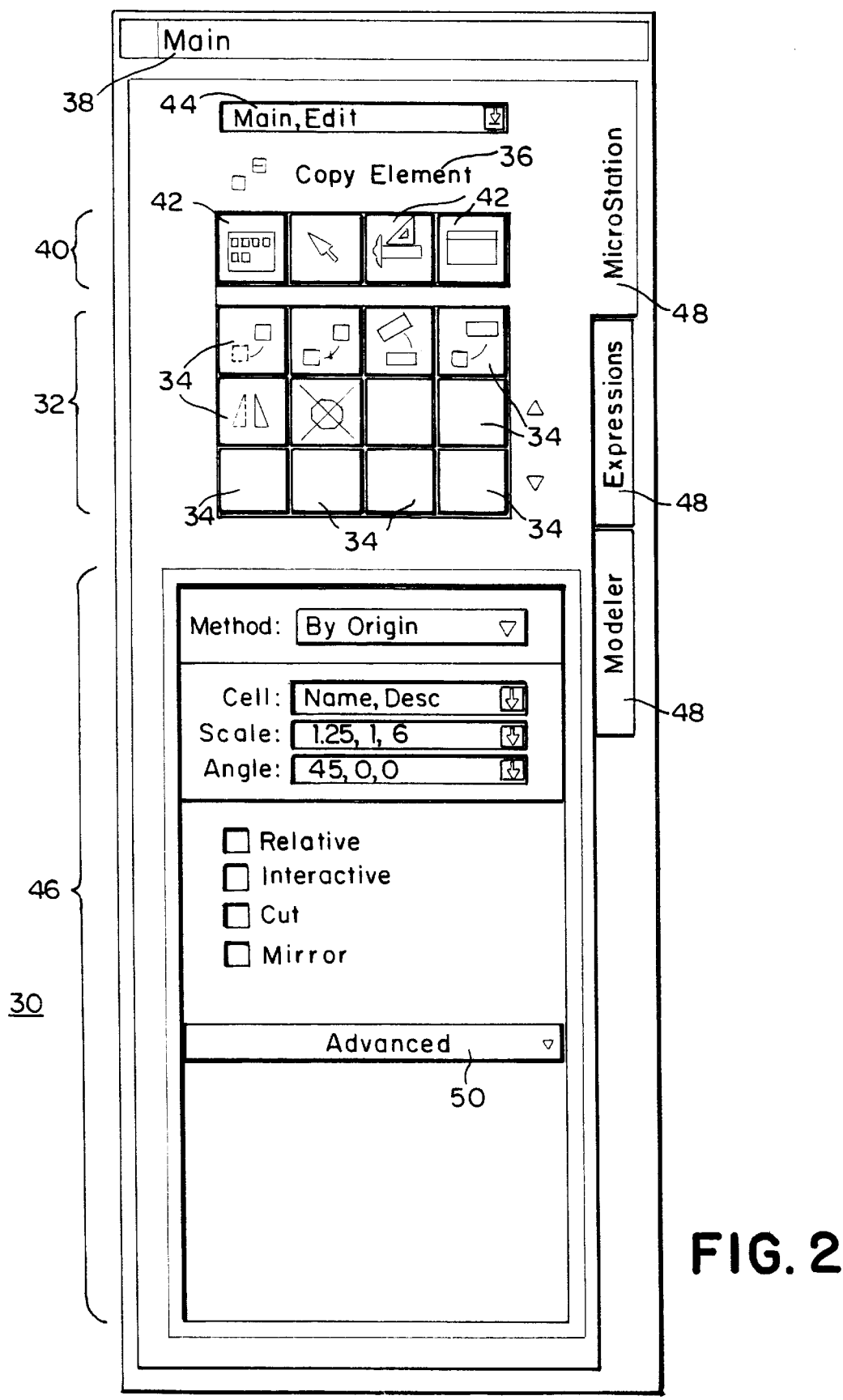
FIG. 2 is a diagrammatic view of an input manager display corresponding to the input manager shown in FIG. 1.
Figure 3:
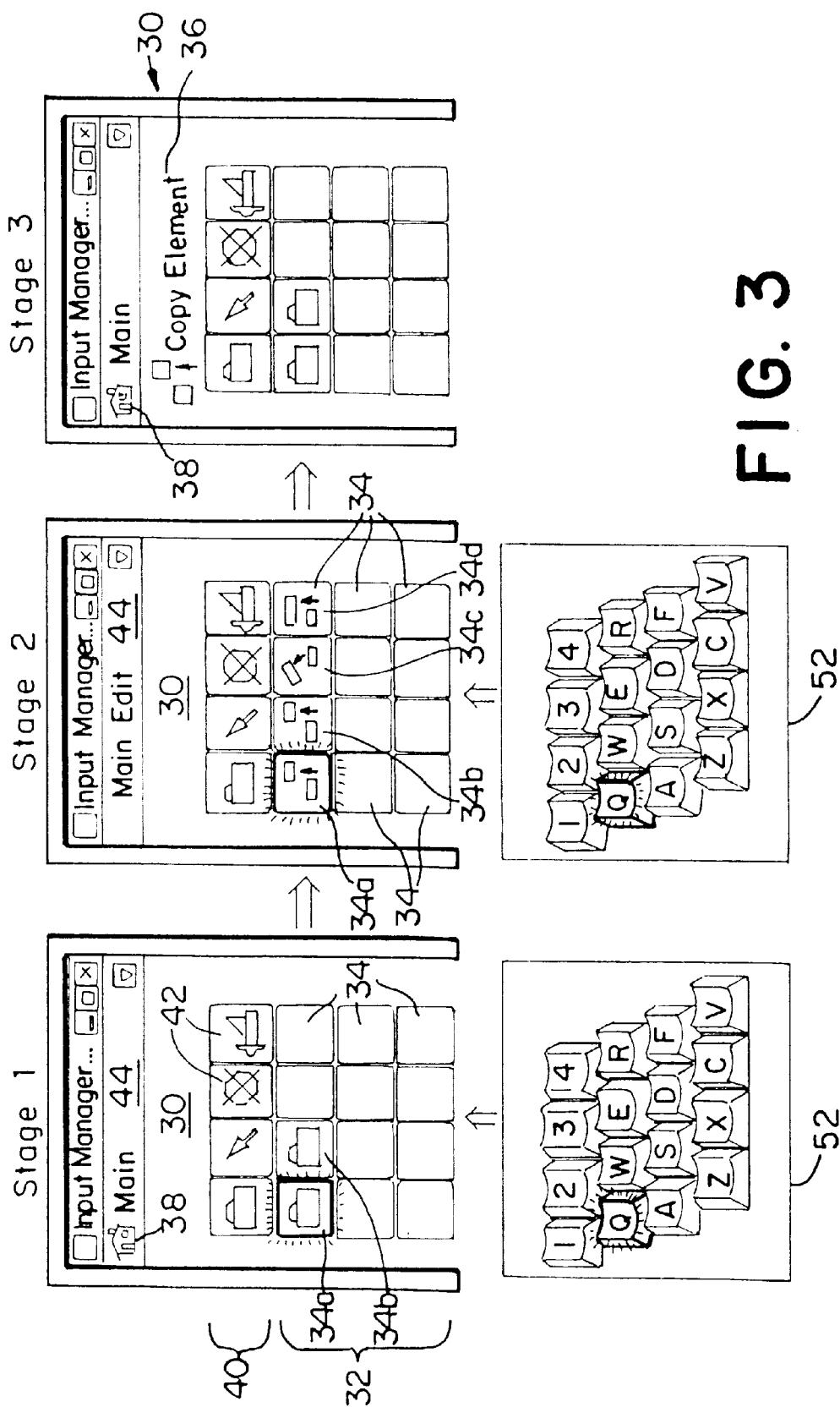
FIG. 3 is a diagrammatic view showing the result of a typical selection of input choices from an input manager display similar to the input manager display of FIG. 2.

Referring now to FIG. 2, it will be seen that in one preferred embodiment of the present invention, the input manager display 30 includes a command grid 32 having a plurality of grid boxes 34. Preferably, each grid box 34 represents an input choice at any one point in time and potentially several input choices over a period of time. That is to say, the input choice represented by each grid box 34 can and most likely will change over time. Preferably, and as seen in FIG. 2, the grid boxes 34 in the command grid 32 extend in a first dimension, and also in a second dimension generally orthogonal to the first dimension. Accordingly, the command grid 32 is an N×M matrix. As seen in FIGS. 2 and 3, the command grid 32 has three rows and four columns. Of course, one skilled in the art will appreciate that other configurations may be employed without departing from the spirit and scope of the present invention.

Preferably, the input choices are organized into a multi-level hierarchy 35, an example of which is shown in FIG. 4. The hierarchy 35 shown in FIG. 4 corresponds to available input choices in a fairly sophisticated design and drawing application 26, such as the BENTLEY MICROSTATION design and drawing application. It should be noted that the hierarchy 35 shown in FIG. 4 does not correspond to any of the input manager displays 30 shown in FIGS. 2 or 3. Nevertheless, one skilled in the art will appreciate that a practically limitless number of hierarchies 35 may be devised in a logical fashion for any particular application 26.

As shown in FIG. 4, the hierarchy 35 is organized into a two-level structure with general 'main', 'tools', 'system', (choices 1, 3, and 11, respectively) and other similar input choices available at the first level. As should be apparent, and as an example, if the 'main' input choice is selected, specific 'main' choices such as 'linear elements', 'cells', 'modify', (choices 1.1, 1.7, 1.12, respectively) and other 1.x choices are then available at the second level. As seen, several first level choices (choices 4–10) and second level choices (choices 2.1–2.12, 11.8–11.12, 12-4–12.12, and others) are as yet unassigned. Preferably, the hierarchy 35 is pre-defined according to the application 26. Also preferably, a user can assign choices and can otherwise modify the hierarchy according to the user's needs.

As seen in FIGS. 2 and 3, the command grids 32 displayed each have 12 grid boxes 34. Accordingly, any hierarchy 35 accessed by such command grid 32 can not have more than 12 choices at any one level or sub-level. Of course, larger numbers of choices can be accessed if the number of grid boxes 34 in the command grids 32 is increased. The choices at any level in the hierarchy 35 can be assigned to the grid boxes in any organized fashion without departing from the spirit and scope of the present invention. For example, choices 1–4 (and x.1-x.4, x.x.1-x.x.4, etc.) can be assigned to the upper row of grid boxes 34, 5–8 (and x.5-x.8, x.x.5-x.x.8, etc.) to the middle row, and 9–12 (and x.9-x.12, x.x.9-x.x.12, etc.) to the bottom row.

Alternatively, a hierarchy 35 accessed by such command grid 32 can have more than 12 choices at any one level or sub-level without increasing the number of grid boxes 34 in the command grids 32, if an option is provided to scroll the options through the grid boxes 34. For example, the options may be arranged in a number of rows such that a user would scroll up and/or down to view all the rows. Preferably, and as seen in FIG. 2, 'up' and 'down' arrows would be provided to actuate such scrolling. Also preferably, the 'up' and 'down' arrows are respectively mapped to pre-determined keys on the input device or keyboard 16.

With the input choices organized into the hierarchy 35, a selection of an input choice from among a first set of input choices associated with the grid boxes 34 (where such input choice is intended to lead to a sub-level of additional choices) preferably results in the first set of input choices being dis-associated from the grid boxes 34 and a second set of input choices being associated with the grid boxes 34. Likewise, a selection of an input choice from among the second set of input choices associated with the grid boxes 34 (where such input choice again is intended to lead to a sub-level of additional choices) preferably results in the second set of input choices being dis-associated from the grid boxes 34 and a third set of input choices being associated with the grid boxes 34. Because of the hierarchical relationship, the second set of input choices is logically related to the selected input choice from the first set of input choices, and the third set of input choices is logically related to the selected input choice from the second set of input choices.

In such a manner, the grid boxes 34 are employed to navigate the input choices of the multi-level hierarchy 35 to arrive at an ultimate command (e.g., a copy command, a run command, etc.) available from the hierarchy 35. Of course, one skilled in the art will appreciate that a particular ultimate command can potentially be within any hierarchy level, and therefore it may not always be necessary to navigate through any set number of levels to reach such particular ultimate command.

Referring now to FIG. 3, it will be seen that an alternate embodiment of the input manager display 30 is shown, here in three different stages of operation, stages 1, 2 and 3. As seen in stage 1, one grid box 34a in the command grid 32 contains a 'file' icon, and another grid box 34b also has a 'file' icon. In this case, the 'file' icon in grid box 34a represents an 'edit' folder which accesses several different editing commands (shown in the command grid 32 in stage 2) in a hierarchy 35. As should now be understood, when the user selects the grid box 34a during stage 1, as shown, the several different editing commands are now accessible to the user during stage 2. In particular, by selecting grid box 34a during stage 1, the grid boxes 34 are altered such that during stage 2, each grid box 34 represents an input choice different from the input choice that such box 34 represented during stage 1 (i.e, at stage 2, the first set of input choices at stage 1 has been replaced by a second set of input choices).

Specifically, in stage 2 of FIG. 3, grid box 34a now has a 'copy' icon, grid box 34b now has a 'move' icon, a grid box 34c now has a 'rotate' icon, and a grid box 34d now has a 'modify' icon. Accordingly, and as shown, if the user selects grid box 34*a* during stage 2, the user will have selected the 'copy' command to be executed in connection with the application 26 (i.e, at stage 3). Preferably, the input manager display 30 includes an active command portion 36, as seen in stage 3 of FIG. 3, where the active command portion 36 displays a command to be executed when such command is selected by the user through navigating the hierarchy 35. As seen in stage 3 of FIG. 3, the active command portion 36 is above the command grid 32, and displays the command icon as well as the command name. Of course, one skilled in the art will recognize that the active command portion 36 could instead display only one of the command icon and the command name without departing from the spirit and scope of the present invention.

Preferably, and as also seen at stage 3 of FIG. 3, once the multi-level hierarchy 35 is navigated to select the command to be executed in connection with the application 26, the input manager 28 and the input manager display 30 return to a home location within the multi-level hierarchy. Preferably, the home location is user-selectable. As seen in FIG. 3, at stage 3, the input manager 28 and input manager display 30 have returned to a 'main' home location such that the input choices associated with the grid boxes 34 at stage 3 are the same input choices associated with the grid boxes 34 at stage 1. Accordingly, at stages 1 and 3, the input manager 28 and input manager display 30 are at the main or top-level location within the hierarchy 35. Preferably, the input manager display 30 includes a home location portion 38 (as shown at stages 1 and 3) displaying the home location. As seen in FIG. 3, the home location portion 38 comprises a 'home' icon that is displayed in a pull-down menu display when the input manager 28 and input manager display 30 are in fact at the pre-determined home location. Correspondingly, in FIG. 2, the home location portion 38 is located within the title portion of the input manager display 30, and comprises the name of the home location, such home location name always being displayed as the default title.

Preferably, the input manager display 30 includes a location portion 44 displaying a current location within the multi-level hierarchy. Accordingly, and as seen in FIG. 3, at stage 1, the location portion 44 shows that the current location is the 'main' or top-level location, while at stage 2, the location portion 44 shows that the current location is the 'edit' sub-level of the 'main' top-level location. Likewise, as seen in FIG. 2, the location portion 44 also shows that the current location is an 'edit' sub-level of a 'main' top-level location.

Still referring to FIG. 2, when a hierarchy 35 is navigated to select a command for execution in connection with the application 26, it may be preferable that the input manager display 30 presents available command settings options in connection with such selected command. As seen, such presented options are located in a command settings portion 46 of the input manager display 30. As should be understood, the available options displayed in the command settings portion 46 will vary from command to command. As seen in FIG. 2, for example, the available options for the 'copy element' command are shown in the command settings portion 46.

The command settings portion 46 shown in FIG. 2 includes an 'advanced' box 50 by which advanced options in connection with the 'copy element' command may be accessed. Of course, one skilled in the art will recognize that the available options displayed in the command settings portion 46 in connection with any particular command can vary without departing from the spirit and scope of the present invention. Moreover, the available options accessed by way of the advanced box 50 may also vary without departing from the spirit and scope of the present invention. Preferably, a user may user-selectably define which options are directly accessible by way of the command settings portion 46 and which options are directly inaccessible by way of the 'advanced' box 50 of the command settings portion 46.

It may be preferable to organize the input choices for the application 26 into a plurality of multi-level hierarchies 35. Accordingly, and as seen in FIGS. 2 and 3, it is preferable that the input manager display 30 have a hierarchy selection portion 40 for allowing a user to select from among a plurality of such multi-level hierarchies 35. Preferably, the hierarchy selection portion 40 is a hierarchy grid having a plurality hierarchy grid boxes 42, where each hierarchy grid box 42 represents one of the plurality of hierarchies 35. For example, in the input manager display 30 shown in FIG. 2, the hierarchy grid boxes 42, from left to right, represent a 'commands' hierarchy, a 'selection' hierarchy, a 'draw' hierarchy, and a 'view' hierarchy. Of course, one skilled in the art will appreciate that other types of hierarchies may be selected by the hierarchy selection portion 40 without departing from the spirit and scope of the present invention. It should now be understood that with the hierarchy selection portion 40 and the command grid 32, a plurality of hierarchies 35 are available to an application user, in the form of a super-hierarchy, and the selection choices in the plurality of hierarchies 35 are available to the application user from a super-grid 32/40 comprising the hierarchy selection portion 40 and the command grid 32.

With the grid boxes 34 in the command grid 32 and the hierarchy grid boxes 42 in the hierarchy selection portion 40 as described above, a mechanism is necessary such that the user can easily access and actuate such grid boxes 34 and hierarchy grid boxes 42. Accordingly, in the preferred embodiment of the present invention, each grid box 34 in the command grid 32 is mapped to a pre-determined key on the input device or keyboard 16, regardless of which input choice such grid box 34 currently represents. Accordingly, the activation of the pre-determined key on the keyboard 16 selects the input choice currently represented by the grid box 34. For example, and referring back to FIG. 3, it is seen that the selection of the 'Q' key on the keyboard always selects grid box 34*a*, regardless of whether grid box 34*a* represents the edit folder (stage 1 and stage 3) or a copy command (stage 2).

Preferably, each hierarchy grid box 42 in the hierarchy selection portion 40 is also mapped to a pre-determined key on the input device/keyboard 16 such that activation of such pre-determined key selects the hierarchy represented by the hierarchy grid box 42. Accordingly, the user can select not only from input choices but also from different hierarchies directly from the keyboard 16 with relative ease.

Preferably, keyboard focus is always (or substantially always) on the input manager display 30. Accordingly, a user of the input manager 28 and input manager display 30 need only key in pre-determined keys on the input device/keyboard 16 to access and actuate grid boxes 34 and hierarchy grid boxes 42. Importantly, with the input manager 28 and input manager display 30 of the present invention, the user need not bother with attempting to correctly position the mouse/cursor 24 on the appropriate grid box 34 in the command grid 32 or hierarchy grid box 42 in the hierarchy selection portion 40 of the input manager display 30. Moreover, the user can operate the keyboard 16 with one hand to select from among input choices in the super-grid 32/40, and can operate the mouse/cursor 24 with the other hand to perform actual designing. By allowing the user to employ both hands, the input manager 28 and input manager display 30 increase the user's productivity and efficiency. Moreover, the user will quickly learn that, for example, to access the copy command in the input manager display 30 (as shown in FIG. 3), such user need only quickly tap the 'Q' key twice. Empirically, it has been found that use of the input manager display 30 by way of the keyboard 16 as described above typically increases user input speed by a factor of three or four or even higher in some instances.

Preferably, each grid box 34 and each hierarchy grid box 42 in the super-grid 32/40 is positioned in the input manager display 30 according to a position of its respective corresponding pre-determined key on the input device or keyboard 16. Likewise, it is preferable that the predetermined key for each grid box 34 or each hierarchy grid box 42 is determined according to a position of the corresponding grid box 34 or corresponding hierarchy grid box 42, respectively, in the input manager display 30.

Figure 5A:
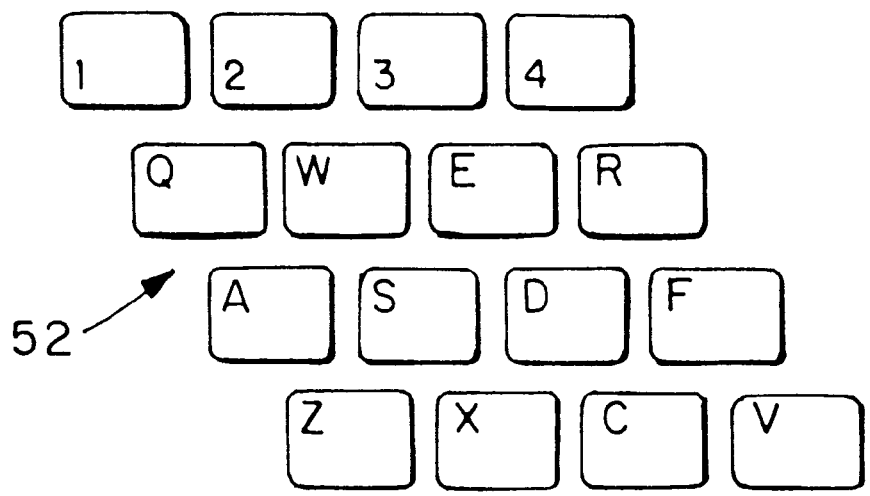
FIGS. 5A and 5B are diagrammatic views of pre-determined keys from a multi-key device organized into first and second key sets, where each key in a key set is mapped to a grid box in the input manager shown in FIGS. 2 or 3.

Accordingly, and as seen in FIG. 3, the four hierarchy grid boxes 42 may be assigned to the '1', '2', '3', and '4' keys on the keyboard 16, respectively, from left to right. Likewise, the upper row of grid boxes 34 in the command grid 32 may be assigned to the 'Q', 'W', 'E' and 'R' keys respectively; the middle row of grid boxes 34 may be assigned to the 'A', 'S', 'D' and 'F' keys, and the lower row of grid boxes 34 may be assigned to the 'Z', 'X', 'C' and 'V' keys, respectively. Such grouped keys are also shown in FIG. 5A. Accordingly, the grid boxes 34 and hierarchy grid boxes 42 are closely spatially aligned with their respective pre-determined keys on the keyboard 16. As should be understood, such spatial alignment reinforces the ease of use of the input manager 28 and the input manager display 30 by the user.

Figure 5B:
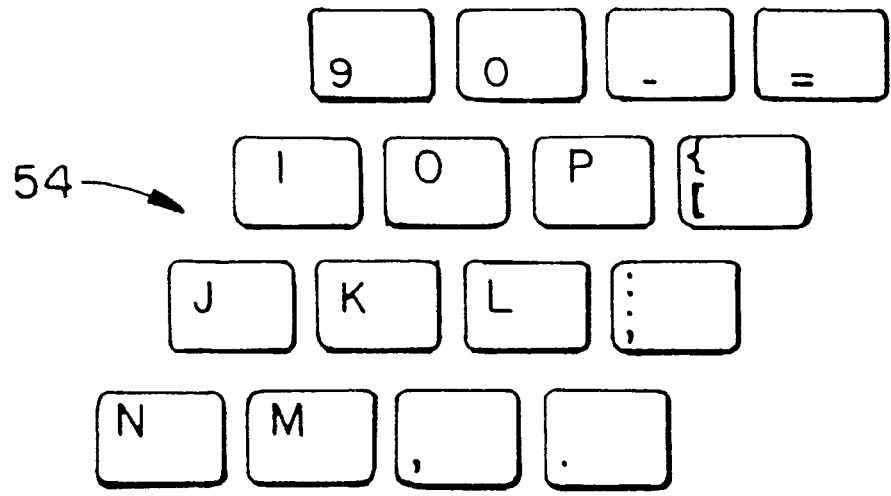

Of course, one skilled in the art will recognize that the grid boxes 34 and hierarchy grid boxes 42 may be assigned to other pre-determined keys without departing from the spirit and scope of the present invention. As but one alternative, and referring now to FIG. 5B, the hierarchy grid boxes 42 may be assigned to the '7', '8', '9' and '0' keys, the upper row of the grid boxes 34 may be assigned to the 'Y', 'U', 'I' and 'O' keys, the middle row of the grid boxes 34 may be assigned to the 'G', 'H', 'J' and 'K' keys, and the lower row of the grid boxes 34 may be assigned to the 'V', 'B', 'N' and 'M' keys.

As may be appreciated, such an alternative set as shown in FIG. 5A generally corresponds to the right side of a typical keyboard 16, while the key set shown in FIGS. 3 and 5A generally correspond to the left side of such a typical keyboard 16. Preferably, the pre-determined keys are organized into first and second user-selectable default sets 52, 54 in accordance with the two scenarios discussed above, as seen in FIGS. 3 and 5A and in FIG. 5B, respectively. Accordingly, with a pair of sets generally located toward the left and right sides of the keyboard 16, respectively, a left-handed or right-handed user may select the default set that is most comfortable for such user, and may then position the mouse 24 adjacent the keyboard 16 as is also most comfortable.

Although the input manager display 30 is oriented to be easily actuatable by way of the keyboard 16, it will be understood that the mouse/cursor 24 may also be employed to select any of the items available on the input manager display 30. Moreover, and as seen in FIG. 2, the input manager display 30 may actually comprise several tabbed pages 48, each tabbed page 48 representing different models of the input manager display 30 tailored to different applications 26 or to different portions of an application 26. For example, and as seen in FIG. 2, one tabbed page 48 is directed toward a 'MICROSTATION' application, while another tabbed page 48 is directed toward 'EXPRESSIONS' and another tabbed page 48 is directed toward a 'MODELER'.

As one skilled in the art will appreciate, the input manager 28 as described above may be operated in connection with most any variation of the computer system 10 as it is described above. For example, it may be the case that the input manager 28 will obviate the need for a mouse 24. On the other hand, it may be the case that certain features of the input manager can only be accessed by a mouse 24. Likewise, the input manager 28 need not necessarily require that the aforementioned 101-key keyboard be the multi-key input device 16. Instead, the input device 16 could possibly be another type of multi-key keyboard, or may even simply be a dedicated multi-key key box, all without departing from the spirit and scope of the present invention. Although it is envisioned that the input manager 28 will be used primarily in connection with drawing and design applications 26 and the like, one skilled in the art will appreciate that the input manager 28 can be employed with any type of application 26 without departing from the spirit and scope of the present invention.

It will be appreciated by those skilled in the applicable art that changes could be made to the embodiments described above without departing from the broad inventive concepts thereof. It is to be understood, therefore, that this invention is not limited to the particular embodiments disclosed, but it is intended to cover modifications within the spirit and scope of the present invention as defined by the appended claims.

What is claimed is:

1. In a computer system including a processor, a display, an application running on the processor and being displayed on the display, and a multi-key input device for inputting information to the application, an input manager for managing the inputting of at least a portion of the information to the application, the input manager running on the processor in conjunction with the application and being displayed on the display in conjunction with the application as an input manager display, the input manager display comprising a command grid having a plurality of grid boxes, each grid box representing an input choice at any one point in time and potentially several input choices over a period of time, each grid box being mapped to a pre-determined key on the multi-key input device regardless of which input choice such grid box currently represents such that activation of the pre-determined key selects the input choice currently represented by the grid box, the pre-determined key being included in a user-selectable default set of pre-determined keys.

2. The computer system of claim 1 wherein the multi-key input device is a standard computer keyboard.

3. The computer system of claim 1 wherein the input choices are organized into a multi-level hierarchy such that a selection of an input choice from among a first set of input choices associated with the grid boxes results in the first set of input choices being dis-associated from the grid boxes and a second set of input choices being associated with the grid boxes, the second set of input choices being logically related to the selected input choice from the first set of input choices.

4. The computer system of claim 3 wherein the input choices are organized into a plurality of such multi-level hierarchies, and wherein the input manager display further comprises a hierarchy selection portion for selecting from among the plurality of such multi-level hierarchies.

5. The computer system of claim 4 wherein the hierarchy selection portion comprises a hierarchy grid having a plurality of hierarchy grid boxes, each hierarchy grid box representing one of the plurality of multi-level hierarchies, each hierarchy grid box being mapped to a pre-determined key on the input device such that activation of such pre-determined key selects the hierarchy represented by the hierarchy grid box.

6. The computer system of claim 5 wherein each grid box and each hierarchy grid box is positioned in the input manager display according to a position of its corresponding pre-determined key on the multi-key input device.

7. The computer system of claim 5 wherein the pre-determined key for each grid box or each hierarchy grid box is determined according to a position of the corresponding grid box or corresponding hierarchy grid box, respectively, in the input manager display.

8. The computer system of claim 3 wherein the input manager display further comprises a location portion displaying a current location within the multi-level hierarchy.

9. The computer system of claim 3 wherein the multi-level hierarchy is navigated to select a command to be executed in connection with the application, wherein the input manager returns to a user-selectable home location within the multi-level hierarchy after a command is selected, and wherein the input manager display further comprises a home location portion displaying the home location.

10. The computer system of claim 9 wherein the input manager display further comprises an active command portion displaying a command to be executed when such command is selected.

11. The computer system of claim 1 wherein the input choices include commands to be selected for execution in connection with the application, and wherein the input manager display further comprises a command settings portion displaying available command settings in connection with a selected command.

12. The computer system of claim 1 wherein the command grid has grid boxes extending in a first dimension.

13. The computer system of claim 12 wherein the command grid has grid boxes extending in a second dimension orthogonal to the first dimension.

14. The computer system of claim 1 wherein each grid box is positioned in the command grid according to a position of its corresponding pre-determined key on the multi-key input device.

15. The computer system of claim 1 wherein the pre-determined key for each grid box is determined according to a position of the corresponding grid box in the command grid.

16. The computer system of claim 1 wherein the pre-determined keys are organized into first and second user-selectable default sets, the first set being generally located toward a first side of the multi-key input device and the second set being generally located toward a second, opposing side of the multi-key input device.

17. In a computer system including a processor, a display, an application running on the processor and being displayed on the display, and a multi-key input device for inputting information to the application, a method for managing the inputting of at least a portion of the information to the application, the method comprising the steps of:

running an input manager on the processor in conjunction with the application and displaying the input manager on the display in conjunction with the application as an input manager display, the input manager display comprising a command grid having a plurality of grid boxes, each grid box representing an input choice at any one point in time and potentially several input choices over a period of time;

mapping each grid box to a pre-determined key on the multi-key input device regardless of which input choice such grid box currently represents, the pre-determined key being included in a user-selectable default set of pre-determined keys; and activating one of the pre-determined keys in the default set to select the input choice currently represented by the corresponding grid box.

18. The computer system of claim 17 wherein the method further comprises the steps of:

organizing the input choices into a multi-level hierarchy;

associating the grid boxes with a first set of input choices from the multi-level hierarchy;

selecting an input choice from among the first set of input choices associated with the grid boxes;

dis-associating the grid boxes from the first set of input choices from the multi-level hierarchy and thereafter associating the grid boxes with a second set of input choices from the multi-level hierarchy, the second set of input choices being logically related to the selected input choice from the first set of input choices.

19. The computer system of claim 18 further comprising the steps of:

organizing the input choices into a plurality of such multi-level hierarchies; and selecting from among the plurality of such multi-level hierarchies.

20. The computer system of claim 19 wherein the input manager display further comprises a hierarchy selection portion having a hierarchy grid with a plurality of hierarchy grid boxes, each hierarchy grid box representing one of the plurality of multi-level hierarchies, the method further comprising the steps of:

mapping each hierarchy grid box to a pre-determined key on the input device; and activating one of such pre-determined keys to select the hierarchy represented by the corresponding hierarchy grid box.

21. The computer system of claim 20 wherein the method further comprises the step of positioning each grid box and each hierarchy grid box in the input manager display according to a position of its corresponding pre-determined key on the multi-key input device.

22. The computer system of claim 20 wherein the method further comprises the step of assigning the pre-determined key for each grid box or each hierarchy grid box according to a position of the corresponding grid box or corresponding hierarchy grid box, respectively, in the input manager display.

23. The computer system of claim 18 wherein the method further comprises the step of displaying a current location within the multi-level hierarchy in a location portion in the input manager display.

24. The computer system of claim 18 wherein the method further comprises the steps of:

navigating the multi-level hierarchy to select a command to be executed in connection with the application;

selecting a command;

returning to a user-selectable home location within the multi-level hierarchy after the command is selected.

25. The computer system of claim 24 wherein the method further comprises the step of displaying the home location in a home location portion in the input manager display.

26. The computer system of claim 24 wherein the method further comprises the step of displaying a command to be executed when such command is selected in an active command portion in the input manager display.

27. The computer system of claim 17 wherein the input choices include commands to be selected for execution in connection with the application, and wherein the method further comprises the step of displaying available command settings in connection with a selected command in a command settings portion in the input manager display.

28. The computer system of claim 17 wherein the method further comprises the step of positioning each grid box in the input manager display according to a position of its corresponding pre-determined key on the multi-key input device.

29. The computer system of claim 17 wherein the method further comprises the step of assigning the pre-determined key for each grid box according to a position of the corresponding grid box in the input manager display.

30. The computer system of claim 17 wherein the method further comprises the step of organizing the pre-determined keys into first and second user-selectable default sets, the first set being generally located toward a first side of the multi-key input device and the second set being generally located toward a second, opposing side of the multi-key input device.

31. The computer system of claim 1 further including a pointing device for inputting information to the application to perform designing on the display, simultaneously with the selecting of the input choice represented by the grid box by activation of the pre-determined key on the multi-key input device.

32. The computer system of claim 31 wherein the pointing device is one of a mouse, a trackball, a joystick, a touchpad and a light pen.

33. The computer system of claim 17 further including a pointing device and a step of performing designing on the display using the pointing device simultaneously with the selecting of the input choice represented by the grid box by activation of the pre-determined key on the multi-key input device.

34. The computer system of claim 33 wherein the pointing device is one of a mouse, a trackball, a joystick, a touchpad and a light pen.

\* \* \* \* \*